US007451206B2

(12) United States Patent
Geck et al.

(10) Patent No.: US 7,451,206 B2
(45) Date of Patent: Nov. 11, 2008

(54) SEND OF SOFTWARE TRACER MESSAGES VIA IP FROM SEVERAL SOURCES TO BE STORED BY A REMOTE SERVER

(75) Inventors: Bertram Geck, Boca Raton, FL (US); Robinson Osmar Lima, Boca Raton, FL (US); Luiz Cesar Zaniolo, Boca Raton, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 613 days.

(21) Appl. No.: 10/151,524

(22) Filed: May 20, 2002

(65) Prior Publication Data

US 2003/0217155 A1    Nov. 20, 2003

(51) Int. Cl.
    *G06F 15/16*    (2006.01)
(52) U.S. Cl. .................... 709/224; 709/218; 717/128
(58) Field of Classification Search ................. 717/128, 717/124; 709/218, 224
    See application file for complete search history.

(56) References Cited

U.S. PATENT DOCUMENTS

| 5,218,601 | A | * | 6/1993 | Chujo et al. ................... 714/4 |
| 5,235,599 | A | * | 8/1993 | Nishimura et al. ............. 714/4 |
| 5,590,245 | A | * | 12/1996 | Leamy et al. ............... 345/418 |
| 5,758,071 | A | * | 5/1998 | Burgess et al. .............. 709/220 |
| 5,768,552 | A | * | 6/1998 | Jacoby ....................... 709/224 |
| 5,809,248 | A | * | 9/1998 | Vidovic ...................... 709/219 |
| 5,872,966 | A | * | 2/1999 | Burg .......................... 719/313 |
| 5,933,639 | A | * | 8/1999 | Meier et al. ................. 717/129 |
| 6,003,143 | A | * | 12/1999 | Kim et al. ..................... 714/38 |
| 6,028,999 | A | * | 2/2000 | Pazel .......................... 717/134 |
| 6,042,614 | A | * | 3/2000 | Davidson et al. ............ 717/116 |
| 6,058,393 | A | * | 5/2000 | Meier et al. ................. 717/124 |
| 6,119,247 | A | * | 9/2000 | House et al. .................. 714/38 |
| 6,125,390 | A | * | 9/2000 | Touboul ..................... 709/223 |
| 6,202,175 | B1 | * | 3/2001 | Mastrangelo et al. ......... 714/38 |
| 6,202,199 | B1 | * | 3/2001 | Wygodny et al. ........... 717/125 |

(Continued)

FOREIGN PATENT DOCUMENTS

EP    1179764 A2 *    2/2002

(Continued)

OTHER PUBLICATIONS

M.Tech. Credit Seminar Report, Electronics Systems Group, EE Dept, IIT Bombay, submitted Nov. 03☐☐Comparison of protocols used in remote monitoring: DNP 3.0, IEC 870-5-101 & ModbusJay Makhija (03307905)☐☐Supervisor: Prof. L.R.Subramanyan.*

(Continued)

*Primary Examiner*—Jason Cardone
*Assistant Examiner*—Ajay Bhatia

(57) ABSTRACT

A system and method for accessing complex computer based systems initiates a trace and debug session via IP causing the resulting output to be stored in a designated remote server on the Internet which can accept large amounts of information. The trace and debug information subsequently can be accessed from any engineering workstation or personal computer from any other location via the Internet. The invention permits the trace sessions to run independent of any local access and permits several technical people in different locations to access the remote storage server simultaneously or independently.

21 Claims, 6 Drawing Sheets

U.S. PATENT DOCUMENTS

| | | |
|---|---|---|
| 6,216,163 B1 * 4/2001 | Bharali et al. | 709/227 |
| 6,219,804 B1 * 4/2001 | Mastrangelo et al. | 709/203 |
| 6,253,211 B1 * 6/2001 | Gillies et al. | 707/201 |
| 6,282,701 B1 * 8/2001 | Wygodny et al. | 717/125 |
| 6,289,025 B1 * 9/2001 | Pang et al. | 370/458 |
| 6,324,683 B1 * 11/2001 | Fuh et al. | 717/124 |
| 6,338,159 B1 * 1/2002 | Alexander et al. | 717/128 |
| 6,351,847 B1 * 2/2002 | Sakamoto et al. | 717/127 |
| 6,470,388 B1 * 10/2002 | Niemi et al. | 709/224 |
| 6,584,491 B1 * 6/2003 | Niemi et al. | 709/202 |
| 6,618,854 B1 * 9/2003 | Mann | 717/124 |
| 6,654,805 B1 * 11/2003 | Aldred et al. | 709/224 |
| 6,675,193 B1 * 1/2004 | Slavin et al. | 709/200 |
| 6,782,386 B1 * 8/2004 | Gebauer | 707/10 |
| 6,795,836 B2 * 9/2004 | Arnold et al. | 707/206 |
| 7,343,586 B1 * 3/2008 | Hernandez, III | 717/124 |
| 2002/0138605 A1 * 9/2002 | Hole | 709/224 |
| 2004/0059789 A1 * 3/2004 | Shum | 709/206 |
| 2004/0167977 A1 * 8/2004 | Douglas et al. | 709/224 |
| 2004/0268314 A1 * 12/2004 | Kollman et al. | 717/128 |
| 2007/0266379 A1 * 11/2007 | Asao | 717/140 |

FOREIGN PATENT DOCUMENTS

| | | |
|---|---|---|
| JP | 11098194 A * | 4/1999 |
| WO | WO 9836356 A1 * | 8/1998 |

OTHER PUBLICATIONS

Debugging protocol for remote cross development environment,Seungwoo Son; Chaedeok Lim; Neung-Nam Kim; Real-Time Computing Systems and Applications, 2000. Proceedings. Seventh International Conference on Dec. 12-14, 2000 pp. 394-398.*

MacNamee, C.; Heffernan, D., "Emerging on-ship debugging techniques for real-time embedded systems," Computing & Control Engineering Journal, vol. 11, No. 6, pp. 295-303, Dec. 2000.*

Hangal, S. and Lam, M. S. 2002. Tracking down software bugs using automatic anomaly detection. In Proceedings of the 24th international Conference on Software Engineering (Orlando, Florida, May 19-25, 2002). ICSE '02. ACM, New York, NY, 291-301.*

* cited by examiner

SEND OF SOFTWARE TRACER MESSAGES VIA IP FROM SEVERAL SOURCES TO BE STORED BY A REMOTE SERVER

BACKGROUND OF THE INVENTION

1. Field of the Invention

The present invention generally relates to capturing and sending of software trace information over the Internet and particularly to systems involving complex software control that requires monitoring of processing.

2. Background Description

Complex real-time software-based systems are often controlled by extensive programming logic that requires developers and technicians to ascertain detailed information about the internal workings of a system as it is performing its intended functions. The systems involved can be of various natures. Telephone systems, airline reservation systems, banking transactions, air traffic control systems, communication centers, and the like all have large, complex real-time software programming. This programming has extensive internal and external messaging and processing demands placed upon it. Often these systems are placed in a network of other similar systems or support systems in which shared or distributed control inter-action is expected to exist smoothly and reliably amongst the systems.

Technical personnel require information of the internal operation of systems for varying reasons. It may be just to verify expected behavior of system, the internal software structures, view hardware characteristics, gather usage patterns, acquire metric information, gather statistical information or to track faults.

Scrutiny and ongoing verification of valid and correct operation of complex software based systems is essential particularly when such systems are engaged in mission-critical operations. Telephone systems, for example, are expected to operate with near flawless performance. Often, the degree of performance and level of confidence of these systems are best acquired through detailed observation techniques.

Sometimes these systems do not perform as expected and the source of the problem must be located and resolved in an efficient manner. To accomplish this, detailed internal information concerning software operations must be made available to technical personnel.

These exemplary systems typically are controlled by one or more microprocessors running a software program or series of programs depending on the nature of the system. Every microprocessor in a system may be susceptible to faults either because of hardware faults or by software processing errors. Software errors can be caused by a plethora of reasons such as, for example, illogical conditions, incorrect messages from other systems, invalid operation control parameters, user action, extreme demands requiring excessive processing time, inadequate logic design, etc. It is these types of fault that designers, engineers, or technicians require detailed information about in order to remedy the situation.

Typically, these systems must also control extensive hardware interfaces such as line and trunk interfaces in a telephone switch, banks of operator positions in an airline reservation center, disk drives, motors, network interfaces, etc. The variations of possible types of hardware are quite extensive. The hardware that provides information to the system, or is the recipient of commands from the system processors, may itself be faulty and cause undesirable or illogical impacts on the system. Often these faults are transitory and of little consequence; however, even what seems to be a minor fault can compound and induce inappropriate system performance or even serious service disruptions.

These systems often have a critical mission to perform and whenever issues or problems arise, engineers, designers, technicians, or operations personnel require a system and method to locate or isolate useful information to debug the situation.

It is common for systems to have built into the operating system software a debug or tracer capability whereby technical personnel can request specific detailed information concerning the performance of the system. These tracer capabilities vary in capability and flexibility. Often, only simple processor register and memory status can be obtained. In more sophisticated tracer and debug facilities, extensive software instruction sequences can be requested including the software subsystem environment, automatic data snapshots, processor stack histories, message histories, etc.

In real-time systems, tracer output is typically written into the system memory for storing, directed to a printer, or written to a local storage device. If system memory is the storage medium, limits are quickly imposed on the amount of data that can be captured. If a local printer is used, it can be a significant issue because the system may not be able to dispose of tracer information fast enough causing loss of information. If a local storage device is employed, the information is kept near the system and creates accessibility and management problems.

However, the debug or tracer capability in large complex systems can potentially produce enormous amounts of output, particularly if engineers must track system operations for an extended period of time; sometimes for days or weeks. This magnitude and nature of the output is generally related to such things as the type of system involved, the nature of the internal message structures, the architecture of the system, the type of fault being tracked, how much processing activity is demanded of the system, or what type of tracer information has been requested by technical personnel, etc.

In situations such as a telephone system network where there may be more than one system under analysis, the potential debug and tracer logging management is very demanding and can potentially be overwhelming. It is this type of situation where the tracer output from one or more systems could potentially be very large, that storage and flexible access to the tracer information is problematic.

An engineer or technician must often correlate processing activities such as message flow and user activity from more than one system over a significant period of time. Proper data capturing methods and storage techniques are needed so that efficient record management is available. Maintaining extensive logs of tracer output in a manner suitable for easy retrieval by one or more technical personnel is crucial. To complicate matters, engineering personnel, who are required to analyze complex tracer information, are often not in one geographic location or even in the same vicinity of the system to be analyzed. Therefore, ease of access by more than one person in any location is desirable.

A suitable system and method to initiate, collect, and retrieve for analysis large amounts of tracer or debug information from multiple targeted systems in a way suitable for technical personnel to retrieve the information from any location is an ongoing problem.

SUMMARY OF THE INVENTION

It is therefore an object of the invention to provide a system that captures tracer and debug information from real-time and non real-time software based computer controlled systems using the Internet.

It is another object of the invention to provide a method of capturing tracer and debug information so that the information is subsequently accessible from virtually any geographic location using the Internet.

It is yet another object of the invention to provide a method and system for managing tracer and debug information using the Internet, Internet Protocol (IP), and other standard protocols so that large amounts of information can be stored, managed, and retrieved.

Further, it is yet another objective of the invention to provide a method permitting multiple systems to be simultaneously monitored so that tracer and debug information from each individual system can be stored and subsequently retrieved independently by one or more technical personnel.

According to the invention there is provided the Internet is used to access one or more software based computer controlled systems so that the tracer and debug facilities within the targeted software based computer-controlled systems can be activated. The debug or tracer facility is a built-in capability of the targeted system's operating software. Design engineers or technical personnel access a selected targeted real-time system, from which specific detailed internal status tracer or debug information is desired, by remote access using the Internet as the access medium. The targeted system is connected to the Internet and has an IP address associated with it. Once a debug or tracer function is activated, the present invention permits the transmission of the tracer and debug information over the Internet to pre-defined server storage destinations. The protocols employed may be several suitable for transfer of data such as File Transfer Protocol (FTP). The storage destination may be physically unrelated to the targeted system; in fact, this present invention permits the highly desirable capability of placing the storage servers remotely.

Engineers, designers, or other technical personnel including quality assurance personnel and maintenance personnel can subsequently access via the Internet the tracer and debug information that has been transmitted to a remote server. The tracer and debug information includes metrics and detailed internal statuses of the system. The means of activating these facilities can be accomplished through the Internet and the resulting debug or tracer information can be sent by the targeted system across the Internet to a storage location, typically a storage server.

Once the storage server has received information from a monitored target system, technical personnel are subsequently able to access the storage server from a remote location and analyze the information. The use of the storage server provides an effectively unlimited storage capability in addition to being accessible from any location over the Internet by authorized personnel.

This invention permits multiple targeted systems to be accessed simultaneously by the same or different technical people. Each system can be directed to send its own tracer and debug information stream to the storage server device selected by the engineer or technical personnel. Multiple servers, each with unique IP addresses, can be employed depending on operational factors and availability of the servers.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A DETAILED EMBODIMENT OF THE INVENTION

In computer based systems that relies upon software processing and programming logic to accomplish the intended mission of the system, the overall reliability and dependability aspects of the system is a prime concern to technical personnel, design engineers and system manufacturers.

In complex real-time based systems such as telecommunications, airline reservation systems, air traffic control systems, banking transaction systems, communication centers, and similar systems, the functional behavior of the systems often must be ascertained by monitoring of internal transactions and statuses of the system itself. Real-time systems typically are composed of extremely large software programs often in the tens of millions of lines of programming code. The system software is typically composed of smaller software components or subsystems.

A newly developed system placed into operation for the first time often requires extensive examination of its ongoing operations in order to verify correct and reliable performance. Often newly deployed systems exhibit unexplained results. Locating these problems often require the aid and attention of the system design engineers employing specialized tools such as tracer and debug monitoring subsystems within the targeted system itself. A debug and tracer facility within software operating systems is established methodology. But the flexibility and options for accessing the targeted systems and retrieving tracer information has been problematic, particularly when engineers cannot be physically present with the system and when the systems produce large volumes of tracer and debug information. This problem is compounded if multiple engineers, who are geographically separate from one another, must access debug and tracer information.

Real-time systems are often updated entirely or in part by subsystem over time for various reasons such as new features, fixing known problems or bugs, or new industry requirements. Over time, introduction of these subsystems into an existing operational system can also be a source of new unexpected system behavior.

Additionally, hardware components of the systems can be sources of unexpected behavior. Electrical components can fail in different ways. Complete failures and partial failures of system electrical hardware components can be sources of unexplained or undesired system behavior. This behavior may be severe faults or intermittent subtle effects that may accumulate ultimately affecting the system integrity in negative ways.

As part of long-term support and maintenance capability of the system, system architects and engineers anticipate these typical unexplained conditions and incorporate tools such as debuggers and tracer facilities within the system operational software. Examination of the internal workings of the system operation using debug and tracer facilities often is the prime debugging tool.

Figure 1:
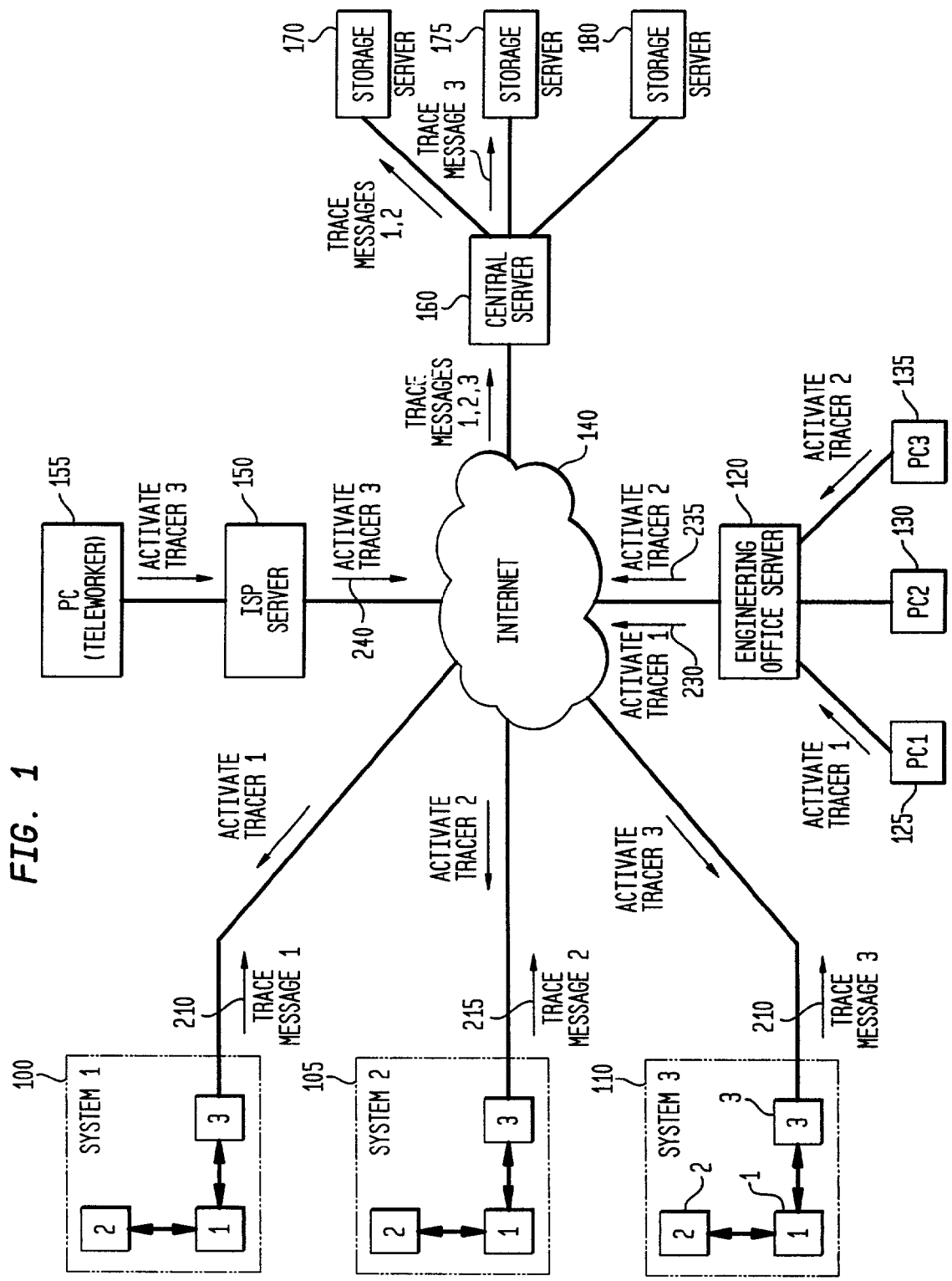
FIG. 1 is an exemplary block diagram of one embodiment of the present invention showing relationships of its elements and possible tracer message storage flow.

Referring now to FIG. 1, this present invention is shown with the exemplary systems 100, 105, and 110. These systems could be any software-based microprocessor controlled system. For purposes of explanation, they will be explained as preferred embodiment of telephone switching systems which design engineers need to target for examination. Each of the systems has within it at least one type of processor 1, memory 2, and IP interface 3; the IP interface having an associated IP address. These components can be of various sizes, speeds and manufacturers. The actual type and selection of components used in the system is often related to the actual nature of the functional mission of the system.

The system software programming is stored in memory 2 and executed by processor 1. The software programming in each representative system 100, 105 and 110 can be an identical program version, different version levels of the same program, or even different software programs entirely due to the nature of the specific system. Each system however contains an independently accessible and operational debug and tracer subsystem.

A software tracer is a mechanism to allow monitoring of the software operation. Software is a series of computer instructions, executable to perform a task. These instructions are located in the system memory and are fetched by the processor to be executed. The instructions can be memory accesses, peripheral accesses, jumps, decision points, input/output, etc. As software executes, it creates a path through the program logic, which is a type of execution history. A special set of instructions that, when executed, can create a report that the processor was executing a particular part of memory or code space, a trace or history of the path of the program can then be generated. This information may be crucial to pinpointing the activity of the software and narrow the search for a fault producing sequence. Additionally, memory contents, register contents, stack information, etc. can be captured at the same instant providing even greater detail of events and current logic conditions represented by the data structures within memory.

FIG. 1 also shows the Internet 140 to which the target systems 100, 105, and 110 are connected. The Internet is a known network arrangement but this could also be a private network. A target system is a system that contains a tracer and debug capability within it and there is a perceived need by an engineer or technical person to monitor its internal operations. Also attached to the Internet are a central server 160 and storage servers 170, 175, and 180. Together these representative servers can receive tracer messages for logging and storing. There may be several of each of these components or a combined server/storage unit.

FIG. 1 also illustrates an engineering office server 120 on which three engineering access stations, typically a personal computer (PC), 125, 130 and 135 are connected. These stations provide access to the Internet for the engineering personal that manage and initiate the debug and tracer sessions at the target systems.

Also shown in FIG. 1 is a teleworker PC, 155, that is connected to the Internet 140 through an Internet service provider (ISP) 150. This illustrative piece shows that from essentially any location with Internet access (home, hotel, etc), this invention can be used and initiated. Again, the number of locations is not a limit.

An engineer or technical person can initiate a debug or tracer session by first accessing a target system 100, 105 or 110 and logging into the system and properly identifying themselves to any system security and receiving authorization to proceed. Sometimes security is minimal and authorization is implicit by simply logging on or gaining access to the system. An engineer or other person familiar with the design and operation of the system software can establish the tracer criteria which may be processor tracer information associated with particular software logic symbol addresses, registers, memory location dumps, etc. In FIG. 1, an engineer at PC1, 125, sends an activate-tracer message, 230, to activate the tracer in the first targeted system, 100. Another or same engineer at PC3, 135, initiates a tracer session on a second system, 105, by sending an activate-tracer message, 235, using parameters for tracing that is appropriate, in the engineer's opinion, for isolating a particular bug or problem. Also shown is another session initiation at the teleworker PC, 155, connected to the Internet through ISP Server, 150 and accessing a third target system with suitable parameters for this system's tracer session by sending an activate-tracer message, 240.

Each of these systems have been supplied with a destination IP address of the storage server and also file control information so that debug and tracer information output is packaged and sent to the correct destination storage servers per the desires of the engineer who originally initiated the tracer debug session. The file information is typically representative of the target system identification. As shown in FIG. 1, the resulting tracer message 210 from target system 100 is illustrated as directed to central server, 160, and on to storage server, 170. The resulting tracer message, 215, from target system, 105, also is directed to storage server, 170, through central server, 160. However, the resulting tracer message, 220, from target system, 110, is shown to be directed to a different storage server, 175, through central server, 160. These storage servers may or may not be physically proximate. Additional central servers may even be involved.

The tracer sessions can be of varying duration of time. Once a session is initiated, it may run freely for hours, days, or weeks before the technical person who initiated the session terminates the session. Sometimes, these sessions are initiated with a predefined length of time to run before the session automatically terminates. In these cases, the session auto-terminates.

The information volume can be highly variable. Sometimes the volume is small because of the chosen tracer criteria selected by the engineer, or the volume of tracer output can be very massive. Because of this uncertainty, a storage medium that is effectively unlimited is an attractive alternative, which this invention provides. Since the engineers managing these sessions can be located essentially anywhere, the ability to deal abstractly with the output is highly desirable. The storage server file management provides file dating and file naming services for many new sessions, which provides a long-term file management service. Engineers will be able to retrieve past tracer sessions for review or comparison with new information at a future date.

Tracer and debug information messages that are produced by the target systems typically contain date and time stamps in order that engineers can properly sequence the information. This date and time-stamping is often necessary to determine exactly when internal system events occur relative to other internal or external events. If events and messages are inter-system dependent (as within networks) it may be necessary to have precise date and time-stamps from more than one system in order to synchronize and determine cause and effects among multiple systems. Often a first system's action can be the source of erroneous behavior in another system that received a message from the first system. Locating this cause and effect is often dependent on having trace and debug information available from both systems. The following Table A illustrates a simple type of tracer messages in a telephone system of which there may be many in a given session. Three messages are shown, each horizontal row constitutes an illustrative message:

TABLE A

| Index:address | t.hh.mm.ss.ms | Event | Port | Src id | State |
|---|---|---|---|---|---|
| 001:022A705A | 023.08.30.10.330 | DL_DT_IN | 0600 | L3_LINK | IDLE |
| 002:022A715A | 023.08.30.20.850 | CD_SETUP | 0600 | L3_PORT | IDLE |
| 003:022A725A | 023:08.30.11.550 | DC_ALERT | 0600 | US_SUB | CALL_INITIATED |

The fields in the above Table A are included in the tracer output messages. The first field is an index of the message plus the address within the software logic from where the message originates. This address is a know point in the software program which bears specific meaning to the design engineer performing the analysis. The second field is a time stamp of when the message or event occurred, down to millisecond granularity. It presupposes that the system clocks have been initialized correctly prior to the initiation of a tracer session. Some types of situations and systems may require even more refined granularity. The type of event is recorded in the next field that is related to the program being examined. Next, a port field records on what particular hardware address the event is associated. Followed by more specific internal identification and state of the object (software or hardware) involved.

Figure 2:
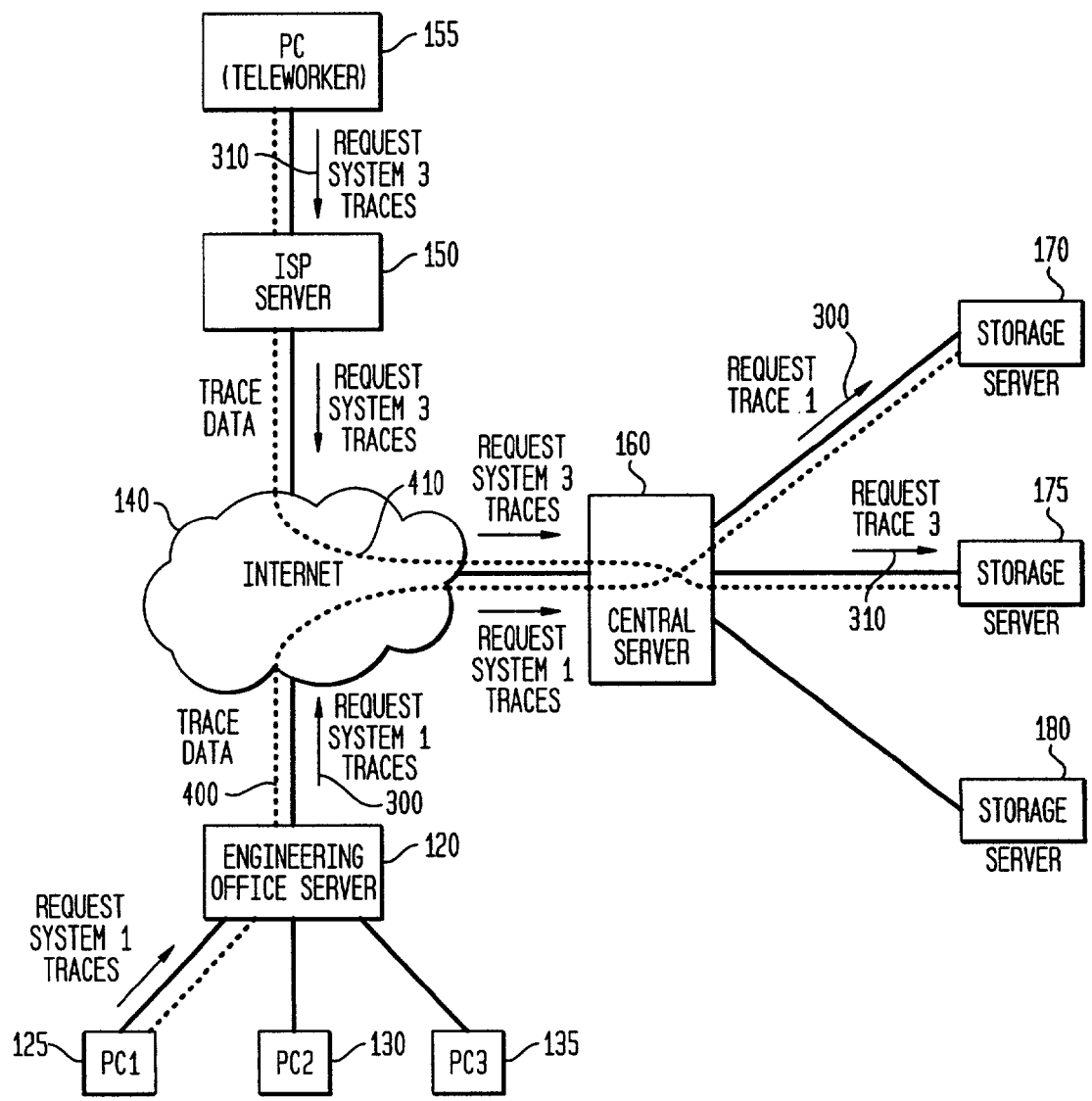
FIG. 2 is an exemplary block diagram showing remote accesses and message flow of tracer information retrieval.

Referring to FIG. 2, this illustration is depicting a scenario whereby the previously stored tracer or debug session output data streams are subsequently accessed by engineers or technical personnel. An engineer at PC1, 125, initiates a request for system traces, 300, for system output generated by system 100 of FIG. 1. This output was previously stored on storage server 170. The retrieval is accomplished via an IP request through the engineering server, 120, the Internet, 140, onward to the exemplary central server, 160, and finally to the storage server, 170. The server, 170, retrieves the file or files and returns the information as trace data, 400. The engineer can analyze and manipulate this data as necessary to isolate and identify bugs or illogical situations. Even metric information, such as processor utilization, trunk occupancy, hardware statuses, alarms, user accesses, or other information concerning the ongoing operation of the system can be determined.

FIG. 2 also illustrates a teleworker at PC, 155, who initiates a request for system traces, 310, which has been previously stored by target system 110 of FIG. 1 on storage server, 175. The trace data, 410, information is returned to the requestor as previously described above. In this illustration, the storage server, 180, has not been accessed.

The trace message packets, 210, 215, 220 (FIG. 1) can be a group of encapsulated messages sent using Transmission Control Protocol/Internet Protocol (TCP/IP) packets where the central server, 160, will decode the messages and store them according to the incoming source. File Transfer Protocol (FTP) is an alternative protocol for transmission of the trace data. Other possible methods of transmission include Trivial File Transfer Protocol (TFTP), Hypertext Transfer Protocol (HTTP), Secure Hypertext Transfer Protocol (S-HTTP), Internet Message Access Protocol revision 4 (IMAP4), Internet Message Access Protocol version 4rev1 (ISAKMP) and Simple Network Management Protocol (SNMP).

Figure 3A:
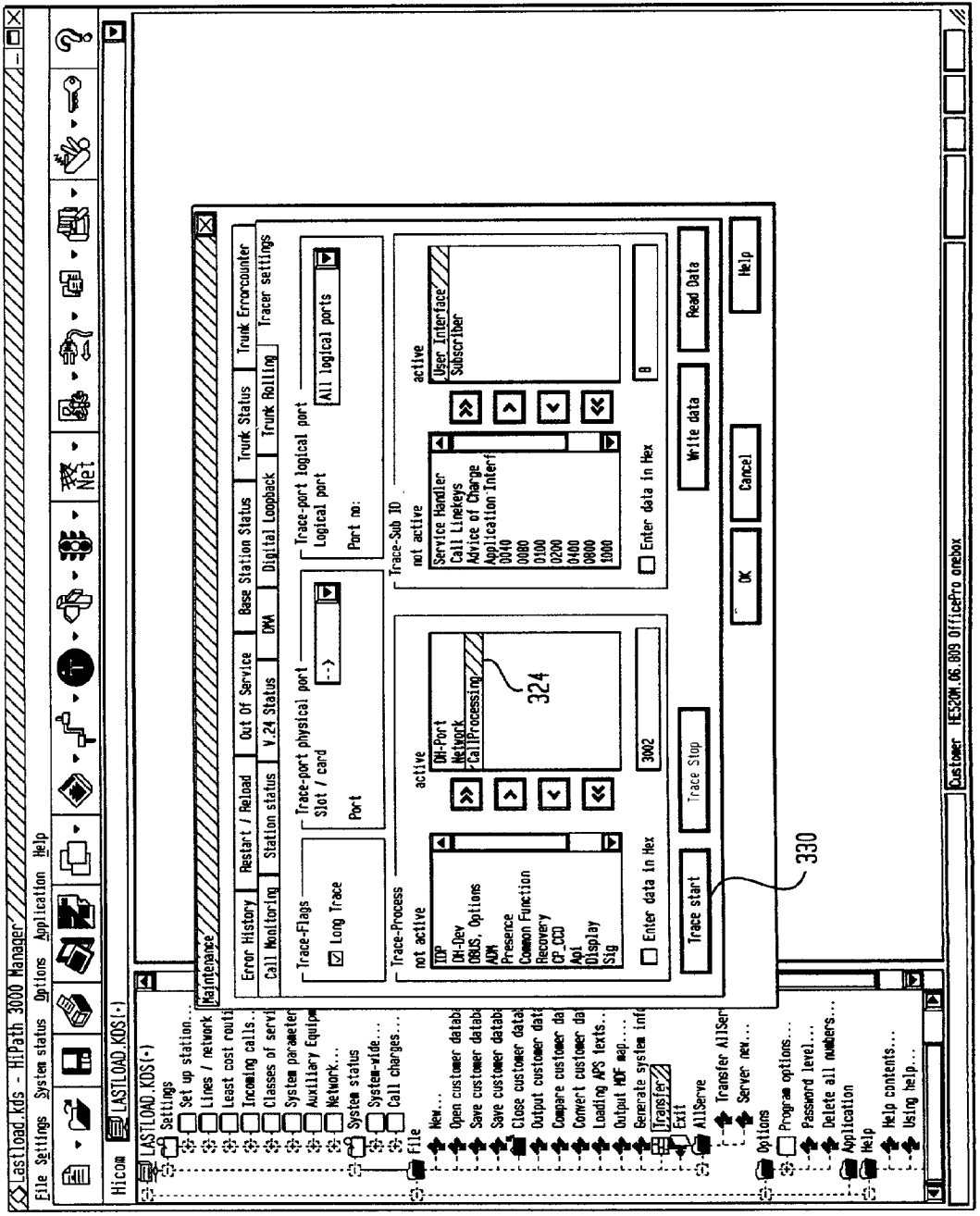
FIG. 3A is an exemplary illustration of a tracer initiation interface screen.

FIG. 3A shows an exemplary illustration of an interface screen that can be used to initiate a trace session on a target system from an engineering station once access is gained to the target system. The sub-window labeled 324 shows which subsystems in the target system are active for tracing. The Trace start button, 330, actually begins the trace activity. The initiation of this tracer session includes the IP address and file specifications of the storage server that will receive the output of the tracer and debug session. FIG. 3C shows an exemplary illustration whereby an IP address 340 is entered for either a target system or for a storage server as appropriate. A similar screen (not shown) would be employed for entering the filename of the trace session output to be used by the storage server. A user selectable tab may also exist on the screen of FIG. 3C (not shown) in order to select the transmission protocol for the transfer of trace output to the storage server.

Figure 3B:
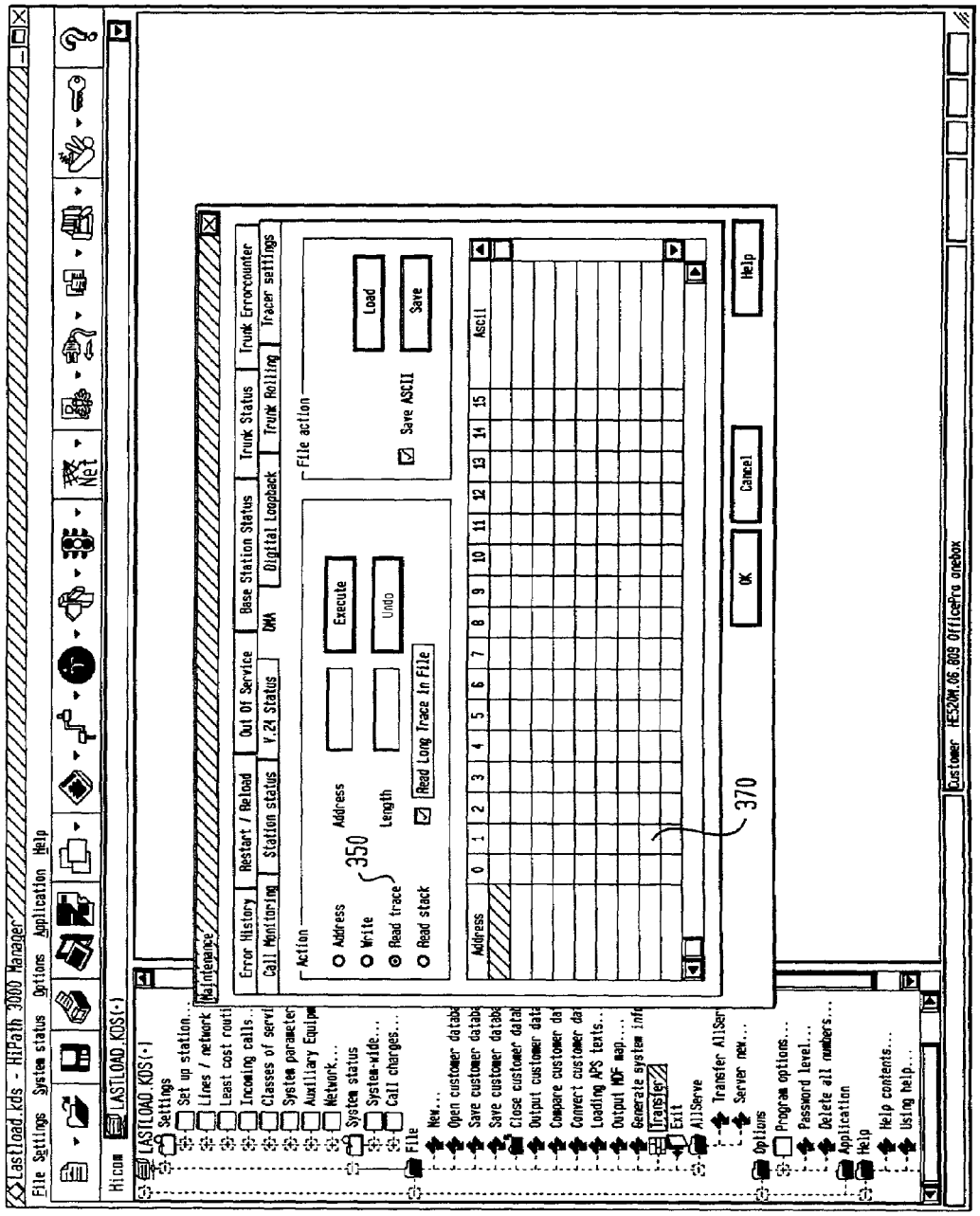
FIG. 3B is an exemplary illustration of an interface screen that is used to retrieve trace and debug information.
Figure 3C:
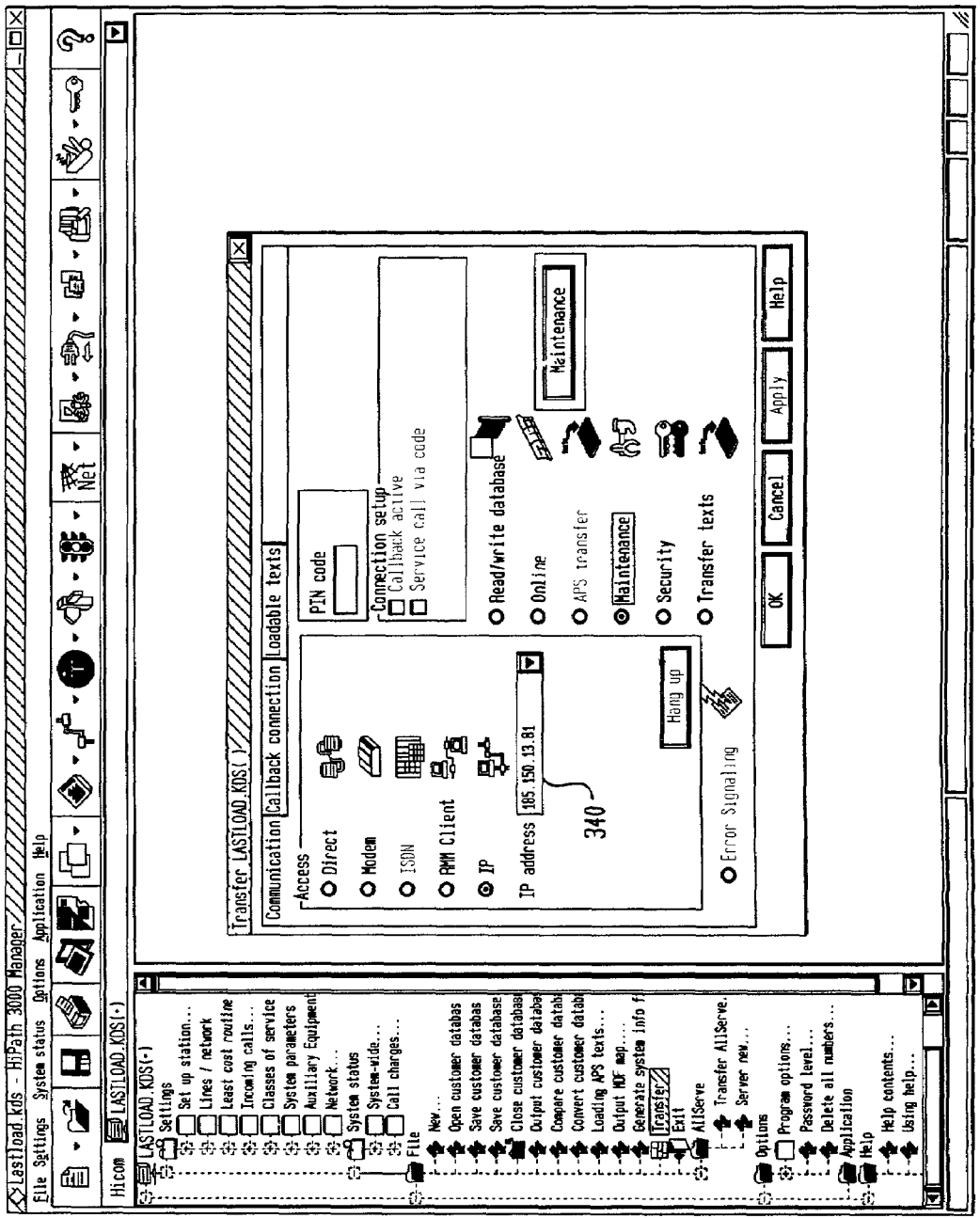
FIG. 3C is an exemplary illustration of an interface screen that is used to specify the IP address of either a target system or IP address of a storage server.

FIG. 3B shows an illustrative user interface screen that may be used to retrieve trace and debug information from the storage server. By providing the IP address of the storage server as shown in FIG. 3C, the screen of FIG. 3B can be employed by selecting Read trace, 350, to access the storage server. The trace output as shown in Table A above, will then be displayed in window labeled 370.

Figure 4:
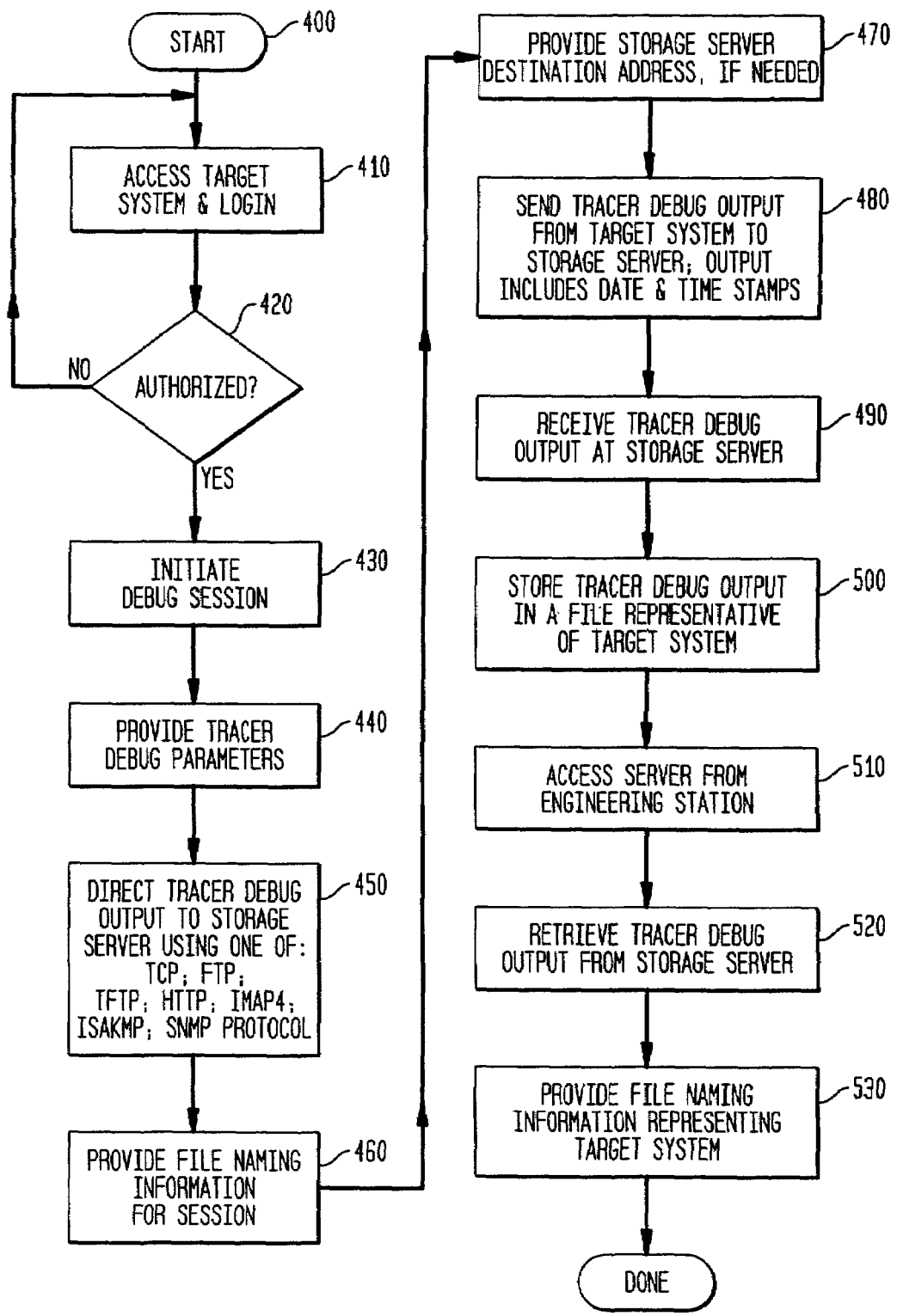
FIG. 4 is a flow diagram showing the overall flow of this invention.

Referring to FIG. 4, the present invention is illustrated by a flow diagram beginning at block 400, and continues to step 410 comprising accessing or logging into a target system from an engineering station (e.g. a personal computer) connected to the Internet. The target system is also connected to the Internet. Once logged in, in decision block 420 it is determined if authorization from the target system has been received. If authorization is denied, the user of this invention must restart access to the target system.

Once access is gained to the target system, a tracer debug session can be initiated at step 430. This session includes providing tracer debug parameters to the target system shown at step 440 and thereafter directing the target system to send tracer debug output (which may contain date and time stamps) to a storage server as shown by step 450. The storage server is also connected to the Internet.

As illustrated at step 450, the target system is capable of sending tracer debug output using any network compatible protocol including:
  a) Transmission Control Protocol (TCP),
  b) File Transfer Protocol (FTP),
  c) Trivial File Transfer Protocol (TFTP),
  d) Hypertext Transfer Protocol (HTTP),
  e) Internet Access Protocol revision 4 (IMAP4),
  f) Internet Message Access Protocol version 4rev1 (ISAKMP), or
  g) Simple Network Management Protocol (SNMP)

In step 460, the user of course can name the file into which the output is stored. Optionally, the storage server destination information (e.g., IP address information) may be provided as shown at step 470 if the target system has not been provided with this information previously or if a different destination is desired for this session.

It is possible that more than one engineering station, storage server, and target system may be utilized. Once the tracer debug output is sent from the target, as shown in step 480, it is received at the storage server as shown by step 490. The message is subsequently stored on the storage server shown at step 500. An engineer, technical person, or other capable person, can subsequently access the storage server from an engineering station shown at step 510 and retrieve the tracer debug output by providing file naming information representing the target system as shown by steps 520 and 530.

While the invention has been described in terms of preferred embodiments, those skilled in the art will recognize that the invention can be practiced with modifications and in the spirit and scope of the appended claims.

Having thus described our invention, what we claim as new and desire by Letters Patent is as follows:

1. A system for initiating tracer sessions, and collecting and storing tracer information for subsequent retrieval and analysis comprising:
   a plurality of target systems connected to the Internet, ones of said target systems being capable of producing tracer information during tracer sessions, said tracer information including date and time-stamps corresponding to real time events occurring during a tracer session on said ones and including file information identifying an originating target system;
   a storage server connected to the Internet; and
   an access station connected to the Internet, said access station for accessing said ones over the Internet to initiate production of said tracer information in a tracer session, and directing said tracer information to be sent over the Internet to said storage server, said access station further for accessing said storage server to retrieve said tracer information over the Internet, wherein events and messages from different ones may by synchronized.

2. A system according to claim 1, wherein said ones selectively monitor internal operations during simultaneous tracer sessions, collect said tracer information from monitored said internal operations, insert date and time-stamps for tracer session events and send collected said tracer information responsive to said access station at the end of said tracer sessions.

3. A system according to claim 1, wherein the storage server comprises a plurality of storage servers storing collected said tracer information, stored said tracer information including program path history during a tracer session on said target system, said program path history including date and time-stamps for tracer session events in said program path history.

4. A system according to claim 3, wherein each said storage server has a unique destination address and said access station specifies said unique destination address, said tracer information being sent over the Internet to said storage server responsive to said unique destination address after a selected number of hours, days, and weeks.

5. A system according to claim 1, wherein the tracer information further includes system memory contents and processor register information for said originating target system during each tracer session, said tracer information being sent using Internet Protocol (IP) upon termination of said each tracer session.

6. A system according to claim 5, wherein said target system is capable of sending said tracer information using at least one of: a) Transmission Control Protocol (TCP), b) File Transfer Protocol (FTP), c) Trivial File Transfer Protocol (TFFP), d) Hypertext Transfer Protocol (HTTP), e) Internet Access Protocol revision 4 (IMAP4), f) Internet Message Access Protocol version 4rev1 (ISAKMP), and g) Simple Network Management Protocol (SNMP).

7. A system according to claim 1, wherein the access station comprises a plurality of access stations and each of said ones having said file information identifying the respective target system, wherein inter-system dependent events are synchronized and sequenced to precise date and time-stamps from tracer sessions collected from identified target systems and determining cause and effects of target system events among multiple said ones.

8. A method to initiate a tracer/debug session on a target system from a remote station, the target system and the remote station connected to the Internet, the method comprising the steps of:
   accessing a target system from the remote station by logging on to the target system and receiving authorization via the Internet;
   initiating a tracer/debug session within the target system from the remote station;
   providing tracer/debug parameters to the target system;
   collecting program path history including date and time-stamps at tracer session events during said tracer/debug session; and
   directing the target system to send tracer/debug output to a remote storage server connected to the Internet, said tracer/debug output including said date and time-stamps corresponding to real time events occurring on said target system and file information identifying said target system as originating said tracer/debug output, wherein upon termination of each said tracer session/debug session, said tracer/debug output is sent to said remote storage server.

9. A method according to claim 8, wherein said target system is capable of sending tracer debug output using a protocol including at least one of: a) Transmission Control Protocol (TCP), b) File Transfer Protocol (FTP), c) Trivial File Transfer Protocol (TFTP), d) Hypertext Transfer Protocol (HTTP), e) Internet Access Protocol revision 4 (IMAP4), f) Internet Message Access Protocol version 4rev1 (ISAKMP), and g) Simple Network Management Protocol (SNMP).

10. A method according to claim 8, wherein the target system comprises a plurality of target systems selectively monitoring internal operations in simultaneous tracer session/debug sessions and collecting tracer information from monitored ones responsive to provided said tracer/debug parameters and sending collected said tracer information to said storage server; and wherein the method further comprises synchronizing and sequencing inter-system dependent tracer session events to said date and time-stamps from tracer sessions and determining cause and effects of target system events among multiple said target systems.

11. A method according to claim 10, wherein the storage server comprises a plurality of storage servers storing collected tracer/debug output, and synchronizing program path histories and sequencing said inter-system dependent tracer session events.

12. A method according to claim 8, wherein the remote station is one of a plurality of engineering access stations, stored said tracer tracer/debug output includes program path history on said target system and sequencing information, wherein inter-system dependent events have said precise date and time-stamps from identified target systems for synchronizing said tracer session events and determining cause and effects among multiple said identified target systems.

13. A method according to claim 8, further including the step of:
providing file naming information for naming a file for storing the tracer/debug output stored on the remote storage server.

14. A method according to claim 13, further including the step of:
providing a storage server destination address.

15. A method according to claim 8, further including the steps of:
terminating said tracer session/debug session after a selected period of time;
sending said tracer/debug output from the target system to said storage server;
receiving said tracer/debug output at said storage server; and
storing said tracer/debug output in a named file at said storage server.

16. A method according to claim 15, wherein the said tracer/debug output includes program path history for one or more tracer session on said target system.

17. A method of claim 15, further comprising the steps of:
accessing said storage server from said remote station; and
retrieving said tracer debug output from said storage server.

18. A method according to claim 17, wherein said step of accessing said storage server includes the step of:
providing a name of said named file.

19. A method according to claim 8, wherein said remote station is a personal computer.

20. A method for remotely managing tracer data, comprising the steps of: connecting a target system to the Internet;
connecting a remote terminal to the Internet;
connecting storage terminal to the Internet;
using said remote terminal to control said target system to conduct a tracer session on said target system for a selected period of time, tracer data being collected during said tracer session;
sending said tracer data to said storage terminal over the Internet under control of said remote terminal said tracer data including date and time-stamps corresponding to real-time events occurring during a tracer session on said target system during said tracer session and including the information identifying said target system;
storing said tracer data with said storage terminal;
and using said remote terminal to retrieve said tracer data from said storage terminal, wherein inter-system dependent events have precise date and time-stamps from identified target systems during said selected period of time for synchronizing said events and determining cause and effects among multiple said identified target systems.

21. A method for remotely managing tracer data as recited in claim 20, said target system selectively monitoring internal operations responsive to said remote control, collecting said tracer data during said tracer session responsive to said remote control said selected period of time having a selected number of hours, days, and weeks, said tracer data including program path history on said target system, said tracer data being transferred over the Internet using one of a) Transmission Control Protocol (TCP), b) File Transfer Protocol (FTP), c) Trivial File Transfer Protocol (TFTP), d) Hypertext Transfer Protocol (HTTP), e) Internet Access Protocol revision 4 (IMAP4), f) Internet Message Access Protocol version 4rev1 (ISAKMP), and g) Simple Network Management Protocol (SNMP).

* * * * *